(12) United States Patent
Tononishi

(10) Patent No.: US 7,719,233 B2
(45) Date of Patent: May 18, 2010

(54) BATTERY PACK

(75) Inventor: Masamitsu Tononishi, Kyoto (JP)

(73) Assignees: Sanyo Electric Co., Ltd., Moriguchi-shi (JP); Sanyo GS Soft Energy Co., Ltd., Kyoto-shi (JP)

( * ) Notice: Subject to any disclaimer, the term of this patent is extended or adjusted under 35 U.S.C. 154(b) by 522 days.

(21) Appl. No.: 11/806,342

(22) Filed: May 31, 2007

(65) Prior Publication Data

US 2007/0279001 A1     Dec. 6, 2007

(30) Foreign Application Priority Data

May 31, 2006  (JP) .............................. 2006-152616

(51) Int. Cl.
- *H02J 7/00* (2006.01)
- *H02J 7/16* (2006.01)
- *H01M 10/44* (2006.01)
- *H01M 2/38* (2006.01)
- *B60R 16/04* (2006.01)

(52) U.S. Cl. ..................... 320/134; 320/136; 320/149; 320/155; 429/50; 429/51; 429/96; 429/176; 429/181; 180/68.5

(58) Field of Classification Search ................ 429/96; 320/134

See application file for complete search history.

(56) References Cited

U.S. PATENT DOCUMENTS

| | | | |
|---|---|---|---|
| 6,218,041 B1 * | 4/2001 | Barbier et al. ................ 429/96 |
| 6,524,732 B1 * | 2/2003 | Iwaizono et al. ............... 429/7 |
| 6,599,657 B1 * | 7/2003 | Pollett et al. .................. 429/96 |
| 6,893,753 B2 * | 5/2005 | Iwaizono et al. ............... 429/7 |
| 7,348,762 B2 * | 3/2008 | Hiratsuka et al. ........... 320/134 |
| 7,531,268 B2 * | 5/2009 | Huang .......................... 429/97 |
| 2002/0142195 A1 * | 10/2002 | Ehara ............................ 429/7 |
| 2003/0082441 A1 * | 5/2003 | Hovi et al. ................... 429/123 |
| 2003/0108780 A1 * | 6/2003 | Iwaizono et al. ............... 429/7 |
| 2003/0180582 A1 * | 9/2003 | Masumoto et al. ............. 429/7 |

FOREIGN PATENT DOCUMENTS

| | | |
|---|---|---|
| JP | 2005-100689 | 4/2005 |
| JP | 2005-135770 | 5/2005 |
| JP | 2005-158452 | 6/2005 |
| JP | 2005-190852 | 7/2005 |
| JP | 2005-190956 | 7/2005 |
| JP | 2006-164559 | 6/2006 |

* cited by examiner

*Primary Examiner*—Patrick J Assouad
*Assistant Examiner*—Yalkew Fantu
(74) *Attorney, Agent, or Firm*—Kratz, Quintos & Hanson, LLP

(57) ABSTRACT

A battery assembly of a battery pack has a structure in which a substrate holder abuts on a side surface of a cell with a protecting circuit being held. The substrate holder includes a first side plate having a circuit part fitted part in which a circuit element of the protecting circuit is fitted and a second side plate along which a first lead is situated. Above the first side plate, a brim is provided that protrudes by an amount substantially equal to the sum of the thicknesses of the substrate and the circuit element, that is, the thickness of the protecting circuit substrate. Above the second side plate, a brim is provided that protrudes by an amount greater than the thickness of the first lead.

18 Claims, 17 Drawing Sheets

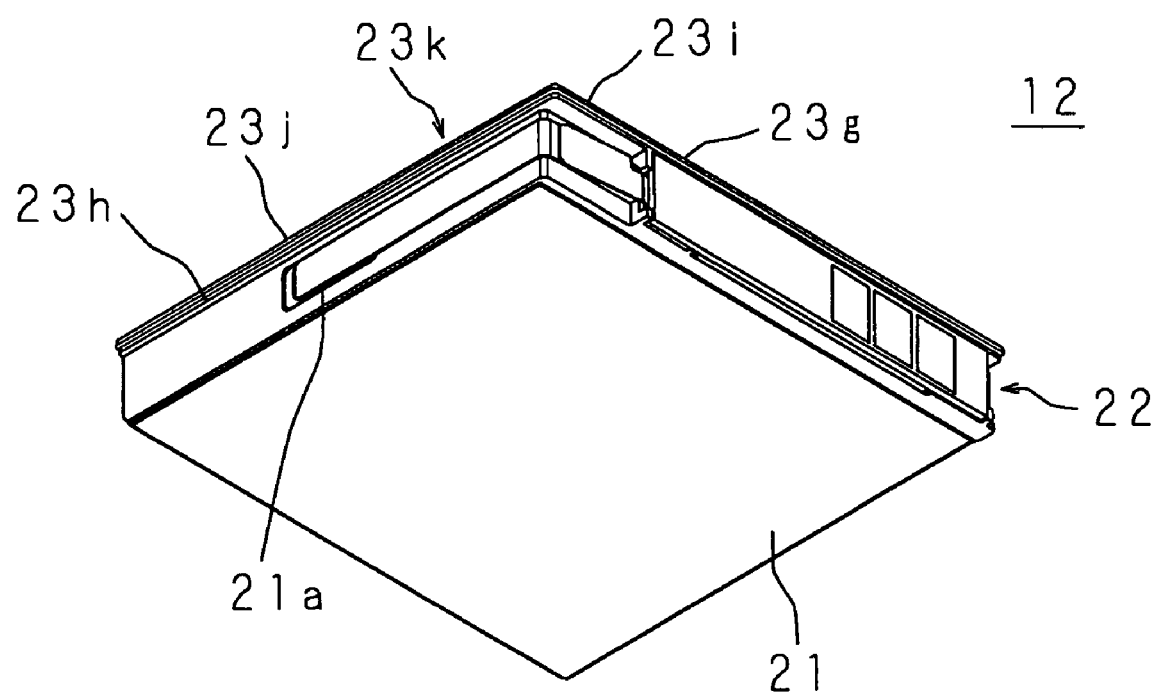
F I G. 8

F I G. 1 4
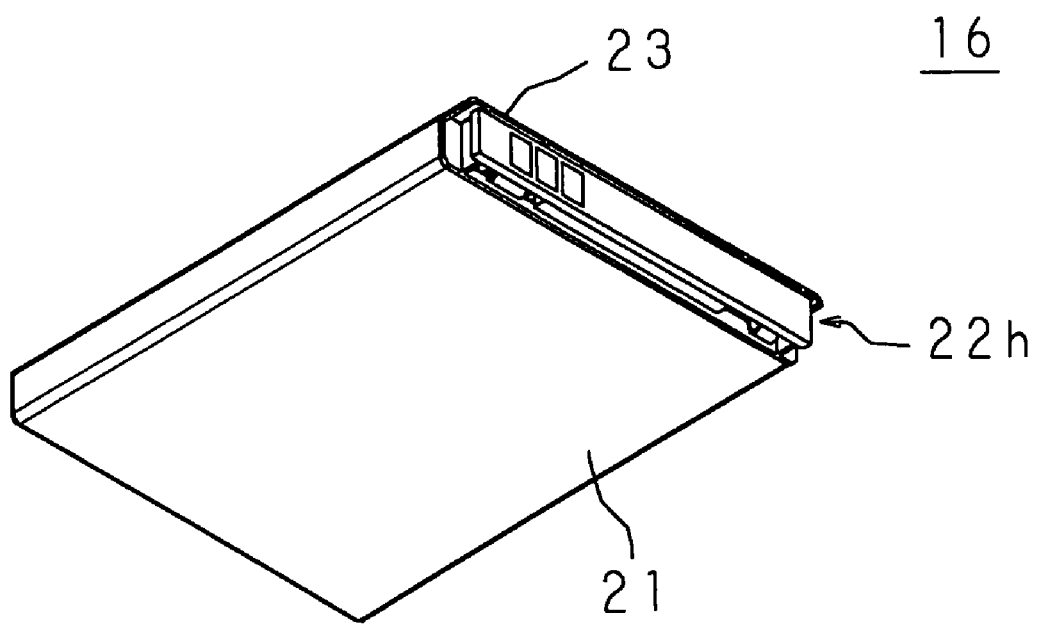

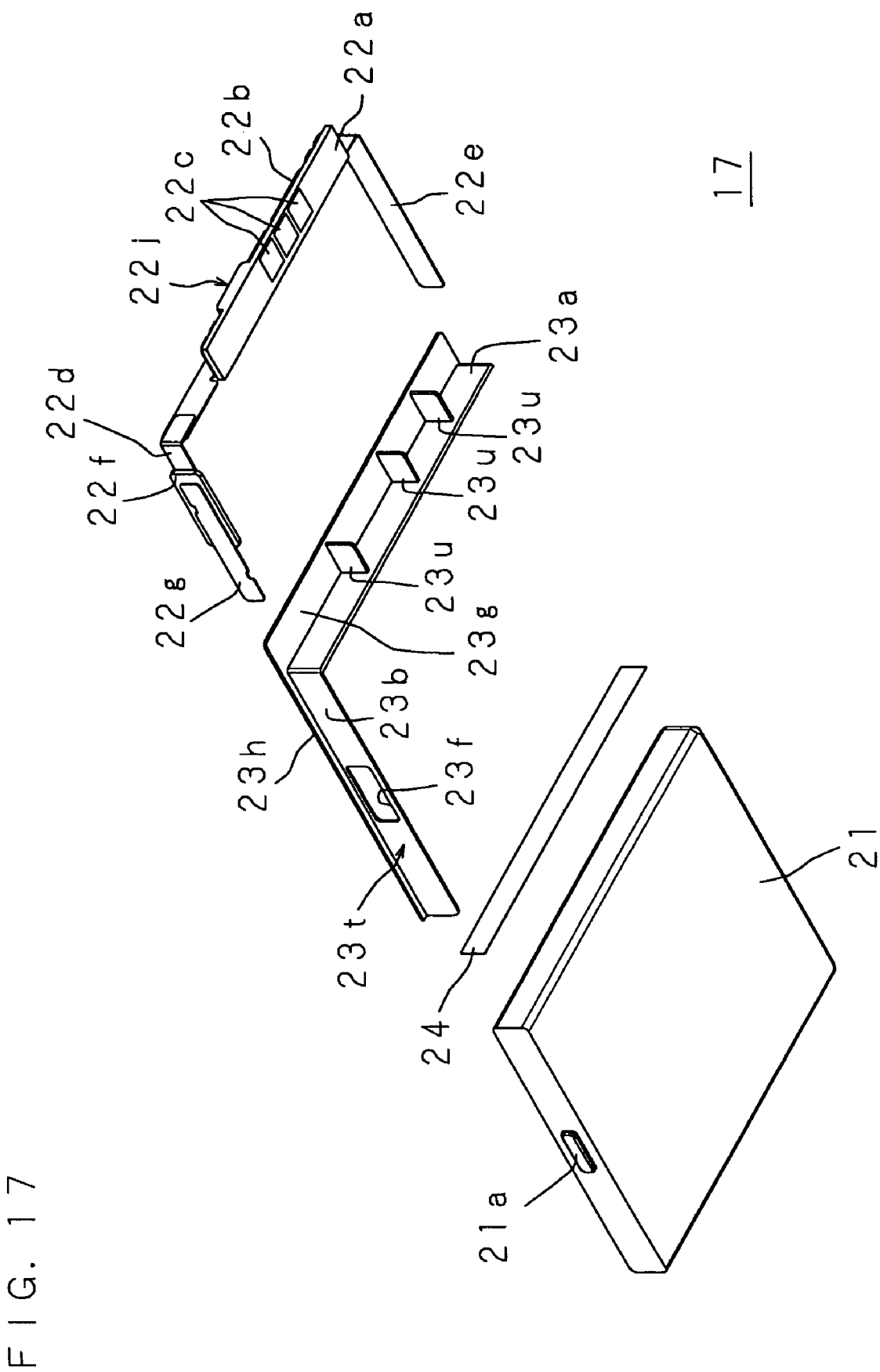

BATTERY PACK

CROSS-REFERENCE TO RELATED APPLICATIONS

This Nonprovisional application claims priority under 35 U.S.C. §119(a) on Patent Application No. 2006-152616 filed in Japan on May 31, 2006, the entire contents of which are hereby incorporated by reference.

BACKGROUND

1. Field

The present aspect relates to a chargeable and dischargeable non-aqueous electrolyte secondary battery used mainly as a power source of mobile electronic equipment such as a video camera, a mobile computer, and a mobile telephone, and more specifically, to a battery pack in which a lithium-ion secondary battery or the like is accommodated in an insulating case.

2. Description of Related Art

In recent years, a chargeable and dischargeable rectangular parallelepiped non-aqueous electrolyte secondary battery such as a lithium-ion secondary battery has been mainly used as a power source of rapidly proliferating mobile electronic equipment such as a video camera, a mobile computer, and a mobile telephone. The lithium-ion secondary battery has a structure in which an electrode assembly comprising a positive electrode and a negative electrode wound via a separator is accommodated in a rectangular parallelepiped case made of aluminum or an aluminum alloy.

A protecting circuit substrate that controls the battery voltage to prevent overcharge and over-discharge is disposed on one side surface of the lithium-ion secondary battery (unit cell) to form a battery assembly. The battery assembly is accommodated in an insulating case made of, for example, a synthetic resin to form a battery pack, and the battery pack is attached to electronic equipment. The protecting circuit substrate and the cell are electrically connected together by a lead plate for connection.

Japanese Patent Application Laid-Open No. 2005-190852 discloses a battery pack assembled by holding a cell in an upper case and a lower case each having the shape of a box with an opening on one surface thereof, which are prepared by splitting a case parallel to a flat surface portion of a battery assembly having the shape of a square flat plate into an upper part and a lower part, and then joining the cases by a method such as ultrasonic welding.

Japanese Patent Application Laid-Open No. 2005-100689 discloses a battery pack in which the undersurfaces of the upper case and the lower case are opened to form picture-frame-like upper and lower frames and after these frames are combined together, a label is wound.

Japanese Patent Application Laid-Open No. 2005-190956 discloses a battery pack in which the undersurface of the case is opened to form a picture-frame-like lower frame and after the lower frame is combined with the upper case, a label is wound.

Japanese Patent Application Laid-Open No. 2005-135770 discloses a battery pack in which an outer frame covering the side surfaces of the battery assembly is separated vertically to the plane surface of the battery assembly into U-shaped right and left frames and after these frames are fitted on the battery assembly, a label is wound. This patent application publication also discloses a battery pack in which the battery assembly is accommodated in a box-shaped case having an opening on one surface thereof and after a sheet cover is placed on the opened surface of the battery assembly, a label is wound.

Japanese Patent Application Laid-Open No. 2005-158452 discloses a battery pack in which a substrate accommodating part for accommodating a protecting circuit substrate is provided on a side plate of a rectangular frame where an external output terminal exposing window is provided.

Japanese Patent Application Laid-Open No. 2006-164559 discloses a battery pack having a case in which a rectangular frame surrounding the periphery of a battery assembly in which a protecting circuit substrate is disposed on one end surface of the cell is formed integrally with a rectangular plate covering the lower surface of the battery assembly, the frame on the side of the end surface serves as a coupling frame that causes the output terminal to be exposed, and the substrate accommodating part in which the protecting circuit substrate is fitted is provided on the coupling frame.

In the battery packs of Japanese Patent Application Laid-Opens Nos. 2005-190852, 2005-100689, 2005-190956, and 2005-135770, since a plurality of cases or frames are assembled or a box-shaped case and a sheet cover are combined together, the number of components is large and the structure is complicated. In addition, the number of assembly man-hours is large and the assembly process is complicated.

In the battery back of Japanese Patent Application Laid-Open No. 2005-135770, if the sheet cover is not accurately pasted to the battery assembly, it can occur that the sheet cover overlaps the side plate of the case or a large clearance is formed between the sheet cover and the case and this causes the inside of the battery pack to be exposed. For this reason, the sheet cover requires extremely high dimensional accuracy, and its pasting is cumbersome.

In the battery packs of Japanese Patent Application Laid-Opens Nos. 2005-158452 and 2006-164559, the substrate accommodating part is provided on the integrally formed outer frame or case in order to solve the problems of the battery packs of Japanese Patent Application Laid-Opens Nos. 2005-190852, 2005-100689, 2005-190956, and 2005-135770, and the number of assembly man-hours can be reduced. Although the outer frame or the case is normally formed by molding plastic with a specifically designed mold, the substrate accommodating part has a structure that cannot be taken out by opening the mold, that is, a so-called "undercut" structure, so that the mold structure for mold release is complicated and this increases the cost of the mold. In addition, since the degree of molding difficulty is high, the yields of components are poor.

SUMMARY

The present aspect has been made with the aim of solving the above problem, and it is an object of the present aspect to provide a battery pack having a simple structure in which a substrate holder is provided that supports a protecting circuit substrate longitudinally disposed on a side surface of a cell and has, on a side plate, a brim protruding outward by an amount not less than the thickness of the protecting circuit substrate or a brim protruding outward by an amount not less than the thickness of a lead plate and a battery assembly is accommodated in a case having an opening on one side, so that the number of components and the number of assembly man-hours can be reduced, the cost of the mold can be reduced since the case has no undercut part in the mold structure, and the protecting circuit substrate can be protected by filling the clearance between the battery assembly and the case with the brim to thereby prevent the exposure of the inside.

Another object of the present aspect is to provide a battery pack in which by a simple structure in which a substrate holder is provided that supports a protecting circuit substrate laterally disposed on a side surface of a cell and has, on a side plate, a brim protruding outward by an amount not less than the protruding amount of the protecting circuit substrate or a brim protruding outward by an amount not less than the thickness of a lead plate and a battery assembly is accommodated in a case having an opening on one side thereof, so that the number of components and the number of assembly man-hours can be reduced, the cost of the mold can be reduced since the case has no undercut part in the mold structure, and the protecting circuit substrate can be protected by filling the clearance between the battery assembly and the case with the brim to thereby prevent the exposure of the inside.

Another object of the present aspect is to provide a battery pack in which the brim has a protruding part protruding further outward and the case has a concave in which the protruding part is fitted, in an opening-side edge of the side plate opposed to the brim, so that the brim can be more stably held by the case by fitting the protruding part in the concave, and the exposure of the inside can be more reliably prevented.

Another object of the present aspect is to provide a battery pack in which since a protecting element supported by the substrate holder is provided and the brim has a width not less than the thickness of the protecting element, so that the protecting element can be prevented from being exposed and be protected.

A battery pack according to a first aspect is provided with:
a battery assembly including:
a cell having a rectangular parallelepiped form including two parallel planes and four side surfaces, and having a protruding electrode on one of the side surfaces;
a protecting circuit substrate having an external output terminal and a protecting circuit, and longitudinally disposed on the side surface of the cell;
a first lead connecting one electrode of the protecting circuit substrate and the protruding electrode; and
a second lead connecting the other electrode of the protecting circuit substrate and a side part of the cell, the side part being an electrode of a polarity different from a polarity of the protruding electrode;
a case having an opening on one face and accommodating the battery assembly; and
a label covering a part or all of the battery assembly and the case,
wherein a substrate holder is provided that includes:
a side plate interposed between the protecting circuit substrate and the side surface of the cell where the protecting circuit substrate is disposed; and
a brim provided to protrude outward from the side plate in a direction of a thickness of the protecting circuit substrate by an amount not less than the thickness of the protecting circuit substrate.

As described above, since the protecting circuit substrate is a substrate on which a circuit element is mounted, here, the thickness of the protecting circuit substrate is the sum of the thicknesses of the substrate and the circuit element.

Since the battery pack of the present aspect has a simple structure in which the battery assembly is accommodated in the box-shaped case unlike the conventional battery packs having the structure in which a plurality of cases or frames are combined or the structure in which a box-shaped case and a sheet cover are combined, and the substrate holder serves also as an insulator, the number of components and the number of assembly man-hours can be reduced. In addition, errors involved in assembly can be reduced.

Conventionally, after the battery assembly is accommodated in a box-shaped case, a sheet cover is placed on the surface of the battery assembly, on the side of the opening, to fill the clearance between the battery assembly and the case, thereby preventing the exposure of the inside and protecting the battery assembly. However, in the present aspect, since the brim can perform the function of the sheet cover, the sheet cover can be deleted. In addition, since the brim is integrally formed on the side plate of the substrate holder, unlike in the case where the sheet cover is placed, it is unnecessary to ensure the position accuracy.

Further, in the present aspect, the case is a simple box in which the side plates are provided around the plane and has no undercut part in the mold structure, the mold structure for component production is simple, and the cost of the mold can be reduced, so that the yields of components can be improved.

A battery pack according to a second aspect is provided with:
a battery assembly including:
a cell having a rectangular parallelepiped form including two parallel planes and four side surfaces, and having a protruding electrode on one of the surfaces;
a protecting circuit substrate having an external output terminal and a circuit element, and laterally disposed on the side surface of the cell;
a first lead connecting one electrode of the protecting circuit substrate and the protruding electrode; and
a second lead connecting the other electrode of the protecting circuit substrate and a side part of the cell, the side part being an electrode of a polarity different from a polarity of the protruding electrode;
a case having an opening on one face and accommodating the battery assembly; and
a label covering a part or all of the battery assembly and the case,
wherein a substrate holder is provided that includes:
a side plate interposed between the protecting circuit substrate and the side surface of the cell where the protecting circuit substrate is disposed;
a brim provided to protrude outward from the side plate in a protruding direction of the protecting circuit substrate by an amount not less than a protruding amount of the protecting circuit substrate; and
a rib provided to hang from the brim for inhibiting a movement of the protecting circuit substrate in a direction perpendicular to the plane thereof.

Conventionally, in the case of a battery pack where a battery assembly in which the protecting circuit substrate is laterally disposed on a side surface of the cell is accommodated in a box-shaped case, an upper case having a cover for covering the protecting circuit substrate is fitted on the case. In the present aspect, since the brim of the substrate holder performs the function of the upper case of filling the clearance between the battery assembly and the case to thereby prevent the exposure of the inside and protect the protecting circuit substrate, the upper case can be deleted.

Since the battery pack of the present aspect has a simple structure in which the battery assembly is accommodated in the box-shaped case, the number of components and the number of assembly man-hours can be reduced. In addition, errors involved in assembly can be reduced.

Further, in the present aspect, the mold of the case has no undercut part, the mold structure for component production is simple, and the cost of the mold can be reduced, so that the yields of components can be improved.

In a battery pack according to a third aspect, in the first or second aspect, the substrate holder has a side plate where the first lead and/or the second lead are independently disposed, and a brim is provided to protrude outward from the side plate in a direction of a thickness of the first lead or the second lead by an amount not less than the thickness of the first lead or the second lead.

In the present aspect, the exposure of the inside can be prevented by filling the clearance between the case and the side surface of the battery assembly where the first lead and/or the second lead are disposed.

In a battery pack according to a fourth aspect, in any of the first to third aspects, a protruding part is provided to protrude outward from the brim and the case has a concave in which the protruding part is fitted, in an opening-side edge of the side plate of the case, opposed to the brim.

In the present aspect, by fitting the protruding part in the concave, the brim can be more stably held by the case, so that the exposure of the inside of the battery pack can be prevented more reliably.

In a battery back according to a fifth aspect, in the third aspect, the side surface of the cell where the protruding electrode is provided and the side surface of the cell where the protecting circuit substrate is disposed are two adjoining side surfaces, and the substrate holder abuts on the two side surfaces.

In the present aspect, since the brim is disposed in the part where there is clearance between the case and the battery assembly in the substrate holder in which the first lead is disposed on the side of the side surface of the cell where the protruding electrode is provided and on the side surface adjoining this, the protecting circuit substrate is disposed so as to be supported, the exposure of the inside of the battery pack is prevented and the battery assembly is protected with reliability.

In a battery pack according to a sixth aspect, in the third aspect, the side plate supports the first lead and a protecting element, and the brim of the side plate protrudes by an amount not less than a sum of the thickness of the first lead and a thickness of the protecting element.

In a battery pack according to a seventh aspect, in the sixth aspect, the protecting element is a discrete element selected from a group comprising a PTC (positive temperature coefficient) element, a fuse, and a bimetallic switch or a composite element into which the discrete elements are combined.

In the sixth and seventy aspects, when the substrate holder supports the protecting element, the protecting element can be prevented from being exposed and be protected.

The above and further objects and features of the aspect will more fully be apparent from the following detailed description with accompanying drawings.

BRIEF DESCRIPTION OF THE SEVERAL VIEWS OF THE DRAWINGS

FIG. 8 is a perspective view showing a battery assembly of a battery pack according to a second embodiment of the present aspect;

FIG. 14 is a perspective view showing a battery assembly of a battery pack according to a fifth embodiment of the present aspect;

FIG. 17 is an exploded perspective view showing the battery assembly.

DETAILED DESCRIPTION

Hereinafter, the present aspect will be concretely described with reference to the drawings showing embodiments thereof.

First Embodiment

Figure 1:
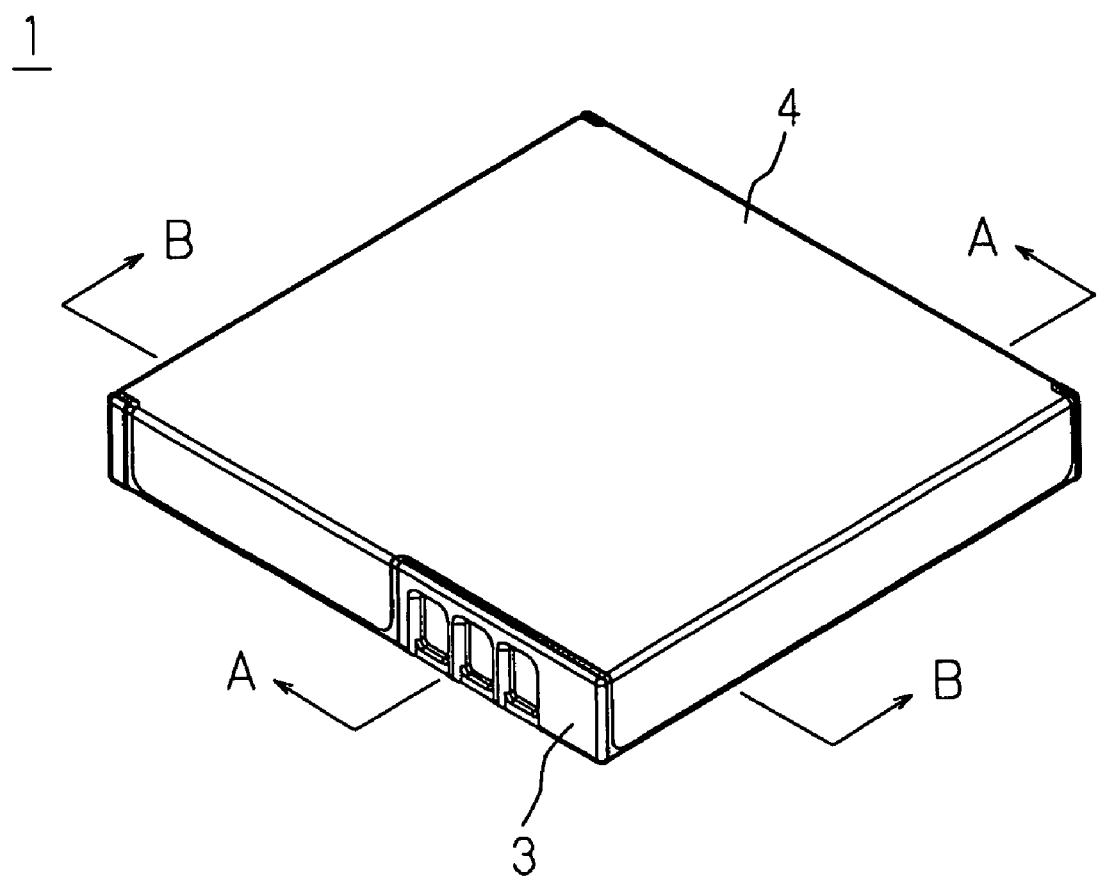
FIG. 1 is a perspective view showing a battery pack according to a first embodiment of the present aspect.
Figure 2:
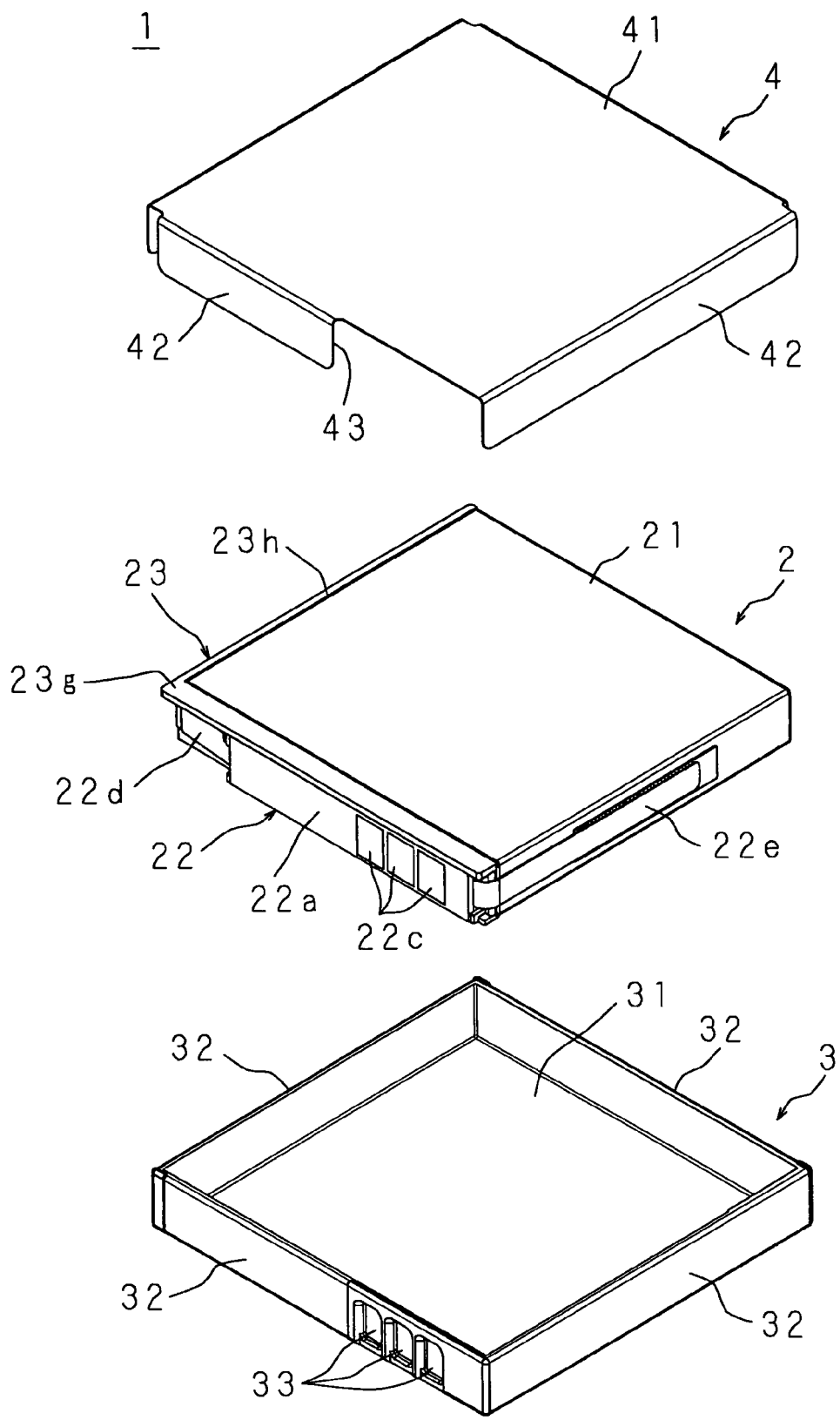
FIG. 2 is an exploded perspective view showing the battery pack.
Figure 3:
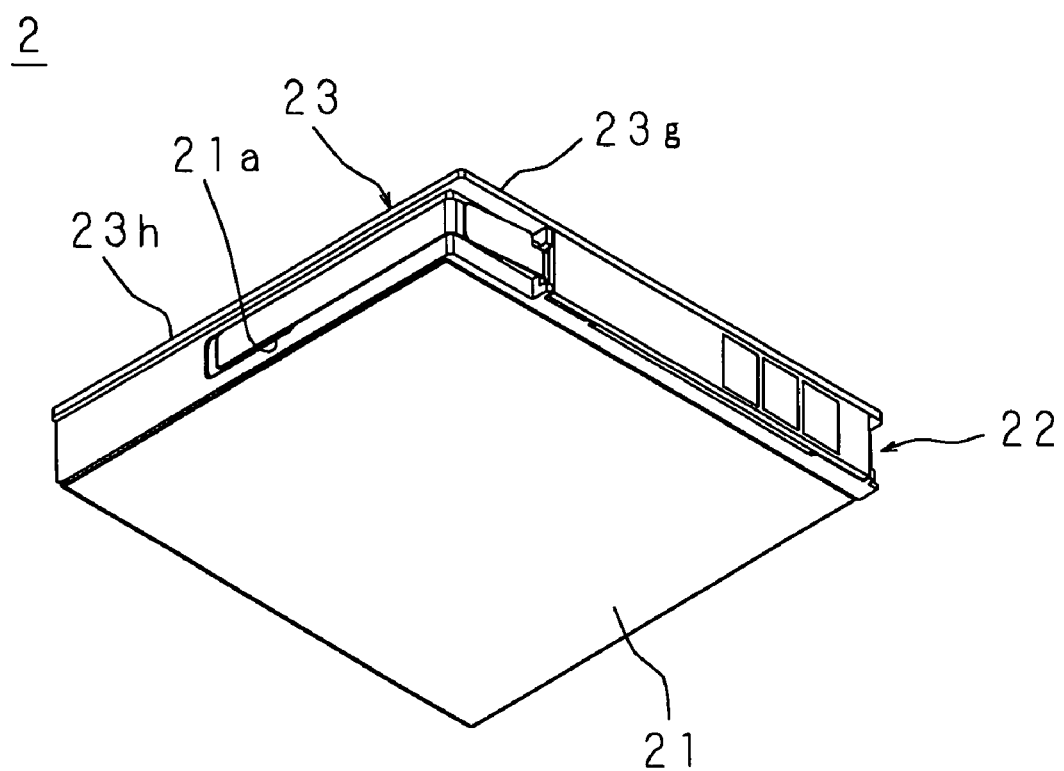
FIG. 3 is a perspective view showing a battery assembly viewed from the rear side.
Figure 4:
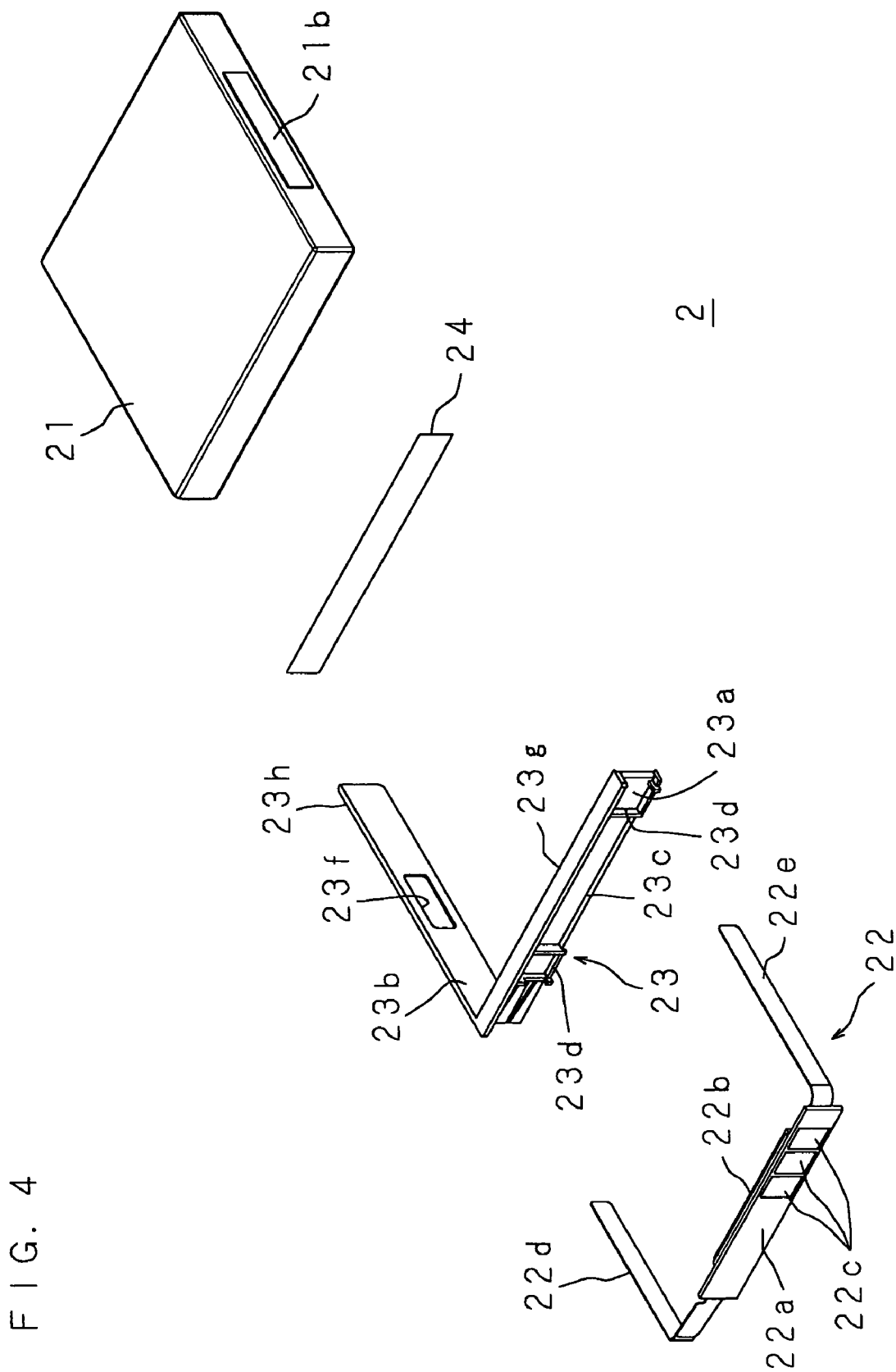
FIG. 4 is an exploded perspective view of the battery assembly.

FIG. 1 is a perspective view showing a battery pack 1 according to a first embodiment of the present aspect. FIG. 2 is an exploded perspective view showing the battery pack 1. FIG. 3 is a perspective view showing a battery assembly 2 viewed from the rear side. FIG. 4 is an exploded perspective view of the battery assembly 2.

A cell 21 of the battery assembly 2 of the battery pack 1 is an square flat non-aqueous electrolyte secondary battery including a electrode assembly comprising a positive electrode and a negative electrode wound via a separator, specifically, a secondary battery such as a lithium-ion secondary battery, and the electrode assembly and non-aqueous substance are accommodated in a case made of aluminum or an aluminum alloy. A negative terminal 21a is provided on one side surface of the cell 21 with an insulating plate (not shown), and a lead attachment plate 21b is provided on the opposite side surface. The entire area of the part of the cell 21 other than the part where the negative terminal 21a is provided is the positive electrode (terminal).

A double-faced fixing tape 24 is attached to a side surface of the cell 21 adjoining the side surface where the negative terminal 21a is provided. A first side plate 23a of a substrate holder (substrate supporter) 23 is attached to the fixing tape 24 in a condition of supporting a protecting circuit part 22.

A circuit element 22b is mounted on the surface of a substrate 22a of the protecting circuit part 22 opposite to the cell 21, and positive and negative external output terminals 22c for taking out power to the outside and taking in power from the outside for charging are formed by gold plating on the opposite side, that is, on the outer side.

A first lead 22d connects the electrode of the substrate 22a and the negative terminal 21a. A second lead 22e connects the electrode of the substrate 22a and a side surface of the cell 21 through the lead attachment plate 21b.

Figure 5:
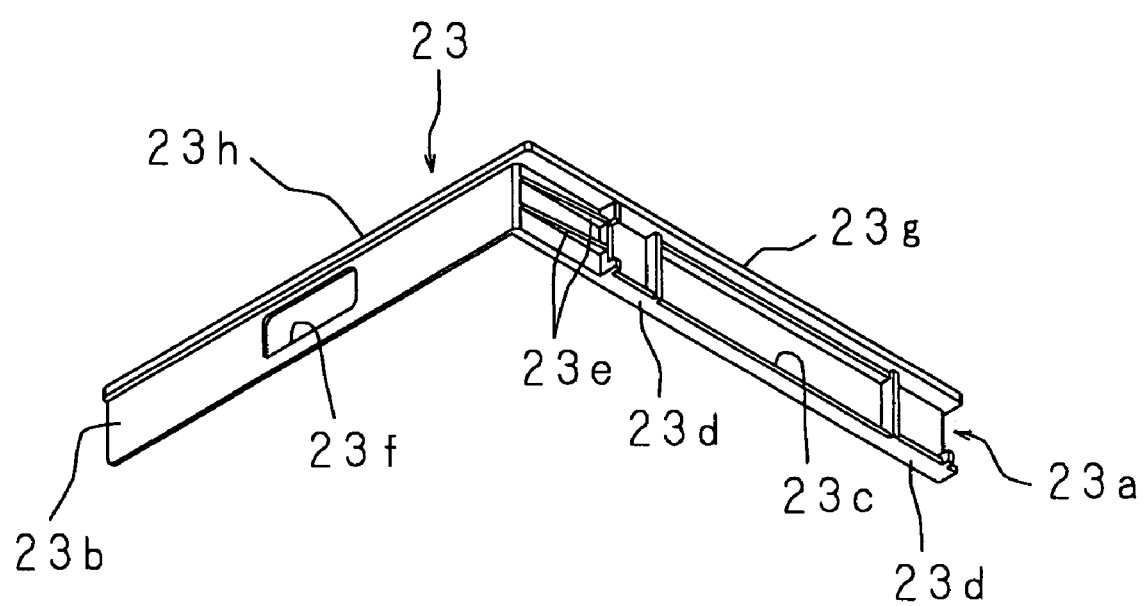
FIG. 5 is an enlarged perspective view showing a substrate holder.
Figure 6:
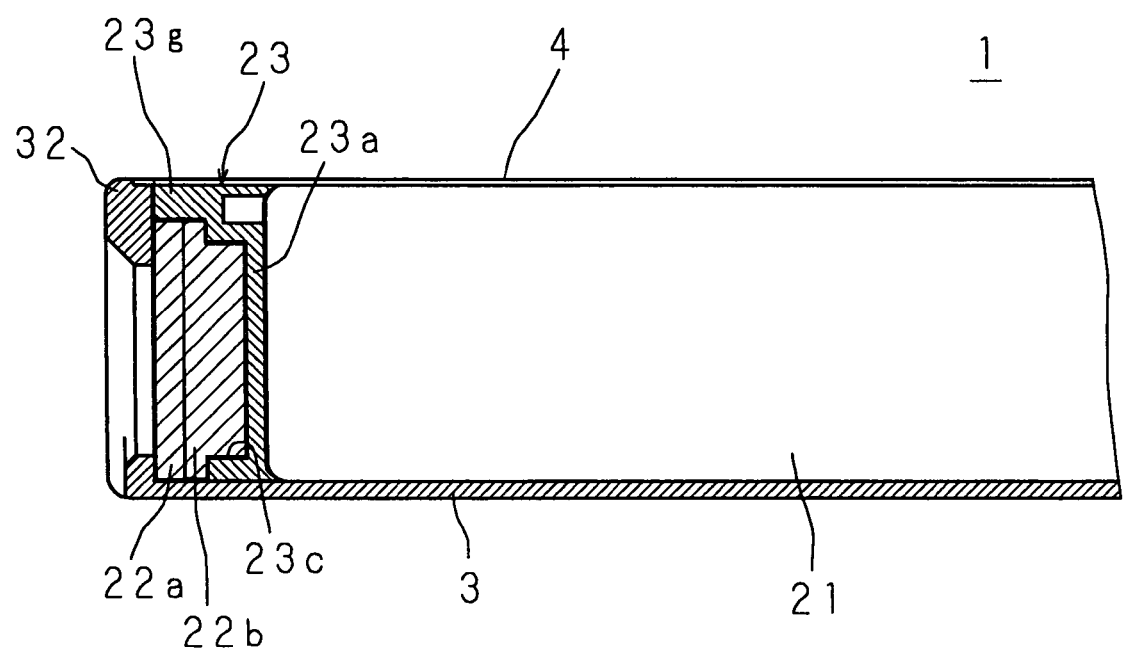
FIG. 6 is a cross-sectional view taken along the line A-A of FIG. 1.
Figure 7:
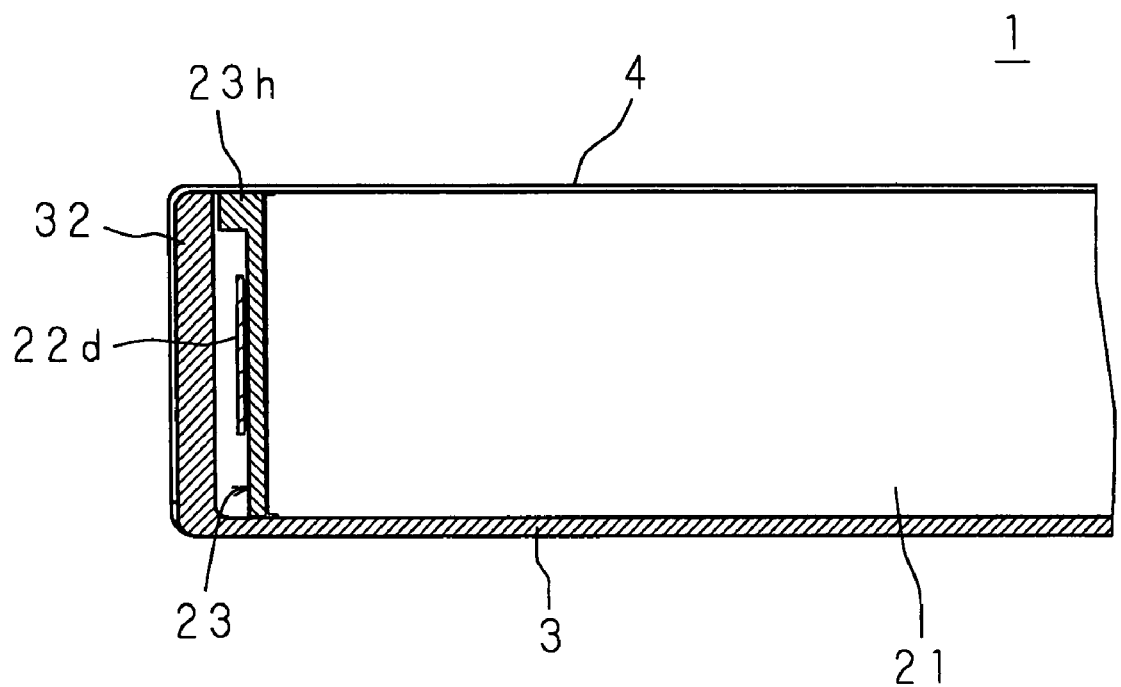
FIG. 7 is a cross-sectional view taken along the line B-B of FIG. 1.

FIG. 5 is an enlarged perspective view showing the substrate holder 23. FIG. 6 is a cross-sectional view taken along the line A-A of FIG. 1. FIG. 7 is a cross-sectional view taken along the line B-B of FIG. 1.

The substrate holder 23 has the first side plate 23a and a second side plate 23b perpendicularly connecting with the first side plate 23a and abutting on the side surface of the cell 21 where the negative terminal 21a is provided.

On the first side plate 23a, a circuit element fitted part 23c protruding from the first side plate 23a in a frame shape and in which the circuit element 22b is fitted is provided, and on both sides thereof, substrate supporters 23d supporting both ends of the substrate 22a are provided. At the end on the side of the second side plate 23b, supporting plates 23e along which the first lead 22d is supported are provided.

A brim 23g protruding from the first side plate 23a by an amount substantially equal to the sum of the thicknesses of the substrate 22a and the circuit element 22b, that is, the thickness of the protecting circuit substrate is provided above the first side plate 23a and on the upper side of the circuit element fitted part 23c. In the present embodiment, the protruding amount of the brim 23g is not less than the sum of the thicknesses of the substrate 22a and the circuit element 22b.

An exposure hole 23f for exposing the negative terminal 21a is provided in a central part of the second side plate 23b.

A brim 23h protruding by an amount greater than the thickness of the first lead 22d is provided above the second side plate 23b.

The circuit element 22b of the protecting circuit part 22 is fitted in the circuit element fitted part 23c of the first side plate 23a structured as described above, the first lead 22d is made to abut on the supporting plates 23e with both ends of the substrate 22a supported by the substrate supporters 23d, and the first side plate 23a is adhered to the side surface of the cell 21 by the fixing tape 24. Then, the first lead 22d is situated along the second side plate 23b, and the end thereof is spot-welded to the negative terminal 21a. The second lead 22e is situated along a side surface of the cell 21 adjoining the side surface on which the first side plate 23b abuts, and the end thereof is spot-welded to the lead attachment plate 21b. In this manner, the protecting circuit part 22 is disposed on the cell 21 in a condition of being held by the substrate holder 23, thereby forming the battery assembly 2.

As shown in FIG. 2, the case 3 made of a synthetic resin includes a plane 31 and side plates 32 provided around the plane 31. One of the side plates 32 has windows 33 for exposing the external output terminals 22c.

A label 4 of an insulating sheet includes a rectangular plane part 41 and side parts 42 hanging down from the plane part 41. One of the side parts 42 has a cut-out 43 for exposing the windows 33.

The battery assembly 2 obtained as described above is accommodated in the case 3 with the external output terminals 22c exposed through the windows 33. Then, the plane part 41 of the label 4 is attached to the exposed surface of the battery assembly 2, and with the windows 33 exposed through the cut-out 43, the side parts 42 are attached along the side plates 32 of the case 3. Thereby, the battery pack 1 is formed.

Since the battery pack of the present embodiment has a simple structure in which the battery assembly 2 is accommodated in the box-shaped case 3 unlike the conventional battery packs having the structure in which a plurality of cases or frames are combined or the structure in which a box-shaped case and a sheet cover are combined, the number of components and the number of assembly man-hours can be reduced. In addition, errors involved in assembly can be reduced.

Conventionally, after the battery assembly is accommodated in a box-shaped case, a sheet cover is placed on the surface, on the side of the opening, of the battery assembly to fill the clearance between the battery assembly and the case, thereby preventing the exposure of the inside and protecting the battery assembly. However, in the present embodiment, since the brims 23g and 23h can perform the function of the sheet cover, the sheet cover can be deleted. In addition, unlike in the case where the sheet cover is placed, it is unnecessary to ensure the position accuracy.

Further, in the present embodiment, the case 3 is a simple box in which the side plates 32 are provided around the plane 31 and has no undercut part in the mold structure, the mold structure for component production is simple, and the cost of the mold can be reduced, so that the yields of components can be improved.

Second Embodiment

Figure 9:
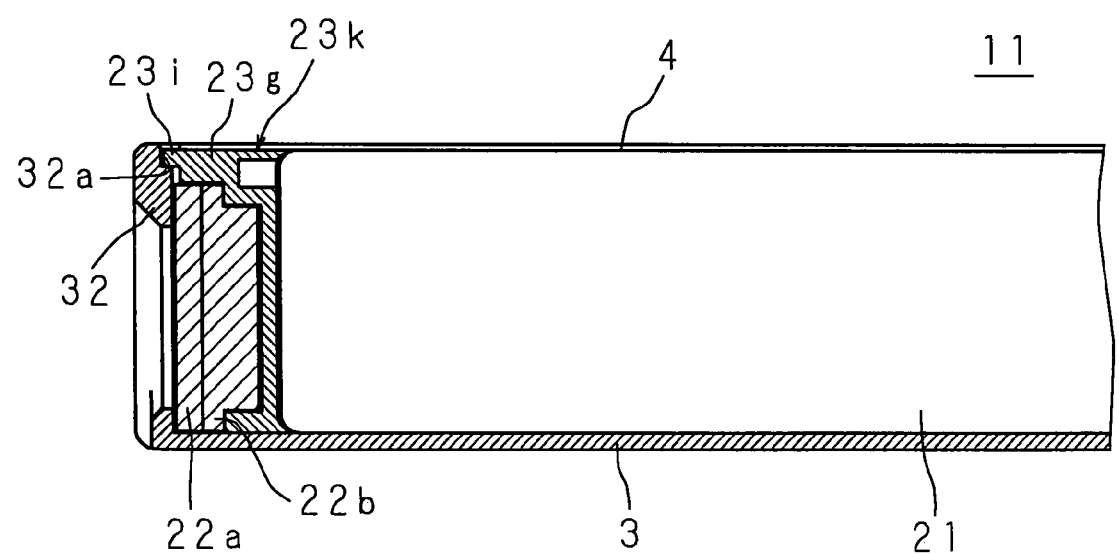
FIG. 9 is a cross-sectional view of the battery pack taken along a plane passing through terminal windows and perpendicular to a side plate of a case where the terminal windows are provided.
Figure 10:
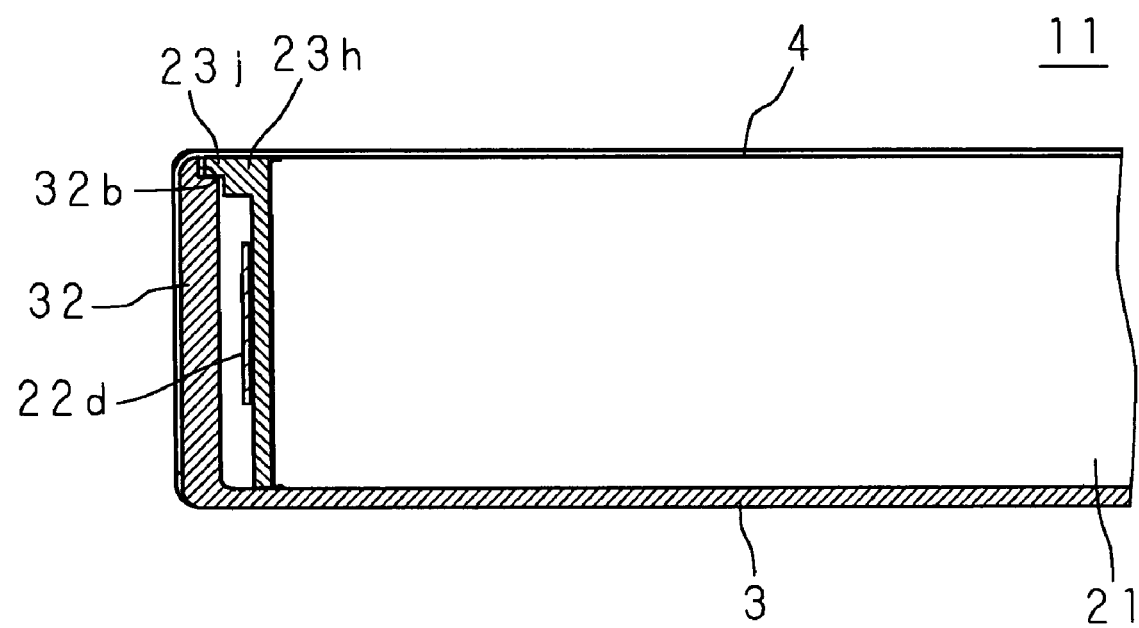
FIG. 10 is a cross-sectional view of the battery pack taken along a plane parallel to the side plate of the case where the terminal windows are provided.

FIG. 8 is a perspective view showing a battery assembly 12 of a battery pack 11 according to a second embodiment of the present aspect. FIG. 9 is a cross-sectional view of the battery pack 11 taken along a plane passing through the terminal windows 33 and perpendicular to the side plate 32 of the case 3 where the terminal windows 33 are provided. FIG. 10 is a cross-sectional view of the battery pack 11 taken along a plane parallel to the side plate 32 of the case 3 where the terminal windows 33 are provided. In these figures, the same parts as those of FIGS. 3, 5, and 6 are denoted by the same reference numerals, and detailed descriptions thereof are omitted.

On a substrate holder 23k of the present embodiment, to the outside of the brim 23g protruding by the amount substantially equal to the sum of the thicknesses of the substrate 22a and the circuit element 22b, a protruding part 23i further protruding from the brim 23g is provided. At the opening-side edge of the side plate 32 of the case 3 opposed to the brim 23g, a concave 32a in which the protruding part 23i is fitted is provided.

To the outside of the brim 23h protruding by the amount greater than the thickness of the first lead 22d, a protruding part 23j further protruding from the brim 23h is provided. At the opening-side edge of the side plate 32 of the case 3 opposed to the brim 23h, a concave 32b in which the protruding part 23j is fitted is provided.

In the present embodiment, by fitting the protruding part 23i in the concave 32a and fitting the protruding part 23j in the concave 32b, the brims 23g and 23h can be more stably held by the case 3, so that the exposure of the inside can be prevented with reliability.

Third Embodiment

Figure 11:
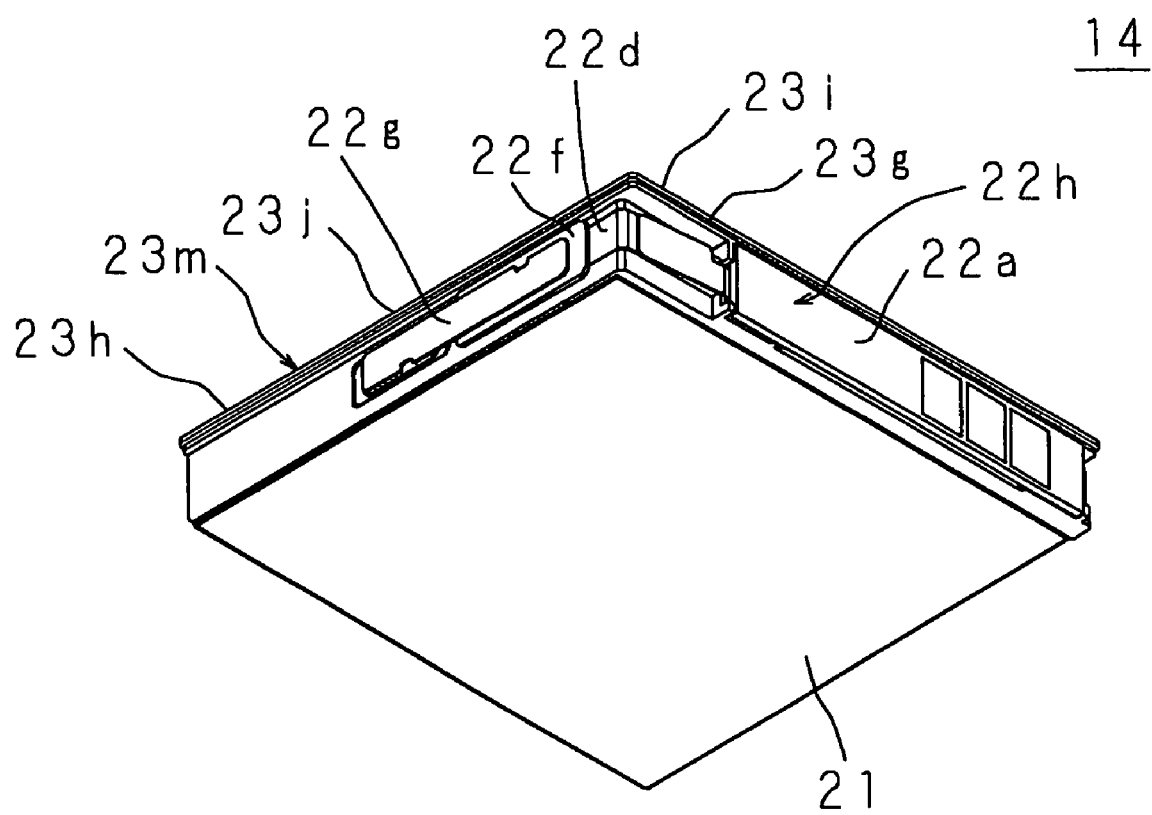
FIG. 11 is a perspective view showing a battery assembly of a battery pack according to a third embodiment of the present aspect.
Figure 12:
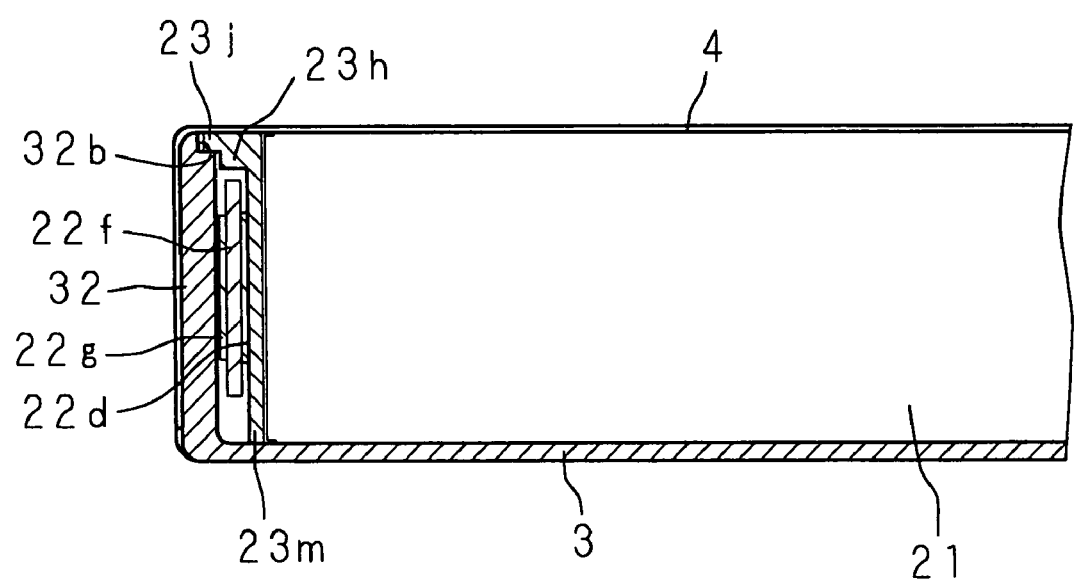
FIG. 12 is a cross-sectional view of the battery pack taken along a plane passing through a PTC element and perpendicular to the side plate of the case where the PTC element is disposed.

FIG. 11 is a perspective view showing a battery assembly 14 of a battery pack 13 according to a third embodiment of the present aspect. FIG. 12 is a cross-sectional view of the battery pack 13 taken along a plane passing through a PTC element 22f and perpendicular to the side plate 32 of the case 3 where the PTC element 22f is disposed. In the figures, the same parts as those of FIGS. 8 and 10 are denoted by the same reference numerals, and detailed descriptions thereof are omitted.

In a protecting circuit part 22h of the present embodiment, the PTC element 22f is connected to the end of the first lead 22d. The PTC element 22f is a protecting element that shuts off the circuit by becoming highly resistive in response to the temperature when, for example, the temperature of the cell 21 is increased abnormally. The PTC element 22f is connected to the negative terminal 21a by a third lead plate 22g.

In a substrate holder 23m of the present embodiment, like in the second embodiment, the protruding part 23i is provided to protrude outward from the brim 23g, and the protruding part 23j is provided to protrude outward from the brim 23h. The brim 23h protrudes by an amount substantially equal to the sum of the thicknesses of the PTC element 22f, the first lead 22d, and the third lead plate 22g. The protruding part 23j is fitted in the concave 32b of the side plate 32 of the case 3.

In the present embodiment, when the substrate holder 23m also holds the PTC element 22f, the PTC element 22f can be protected by preventing the exposure of the PTC element 22f with the brim 23h. Since the protruding part 23j is fitted in the concave 32b, the brim 23h is stably held by the case 3.

While the substrate holder 23m holds the PTC element 22f as the protecting element in the present embodiment, the present aspect is not limited thereto. The substrate holder 23m may hold a discrete element selected from a group comprising a PTC element, a fuse, and a bimetallic switch or a composite element into which the discrete elements are combined. In this case, it is necessary that the brim 23h has a width greater than the thickness of the protecting element, and when the lead plate is connected in the direction of the thickness of the protecting element, has a thickness not less than the sum of the thicknesses of the protecting element and the lead plate.

Fourth Embodiment

Figure 13:
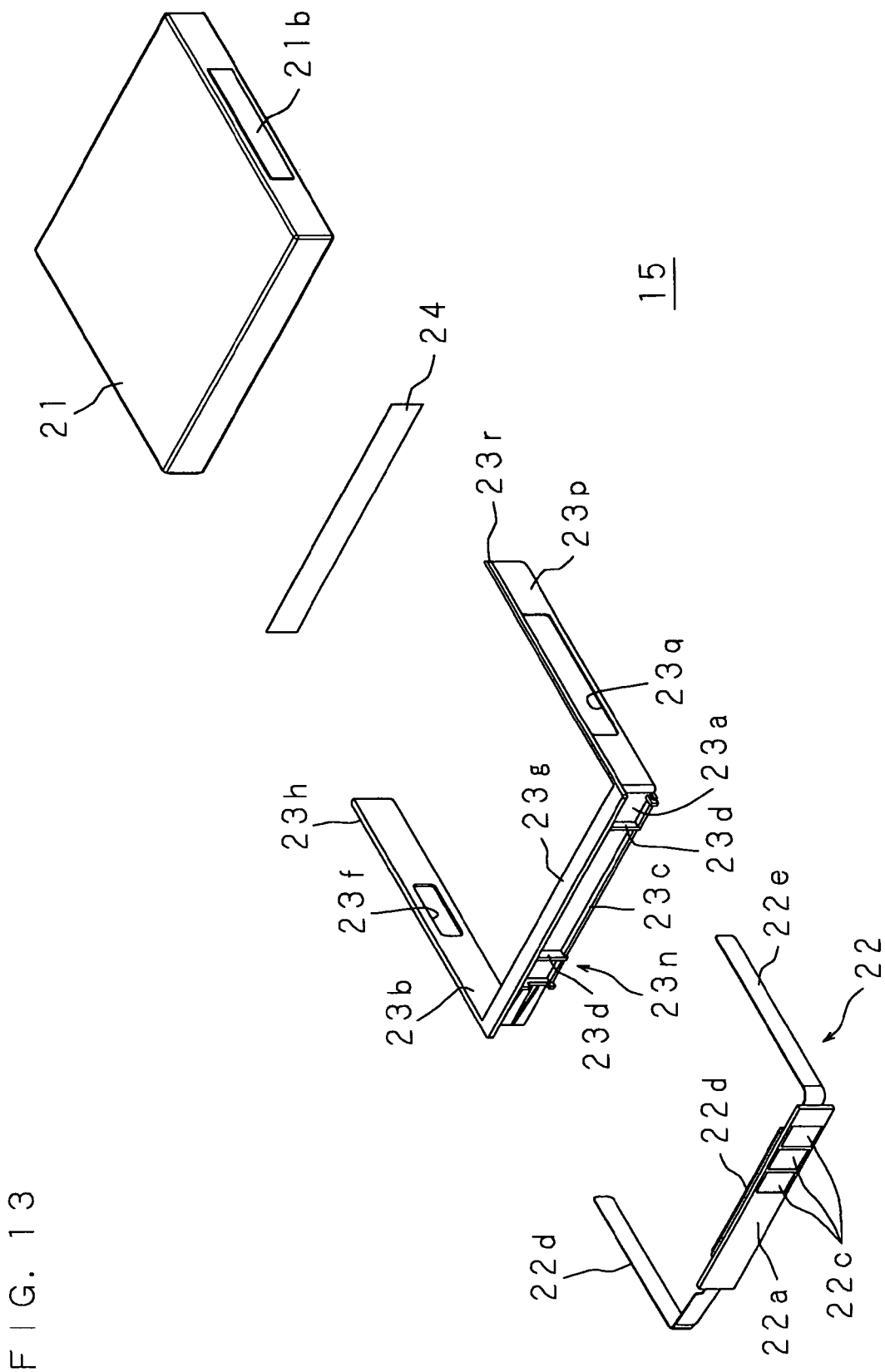
FIG. 13 is an exploded perspective view showing a battery assembly of a battery pack according to a fourth embodiment of the present aspect.

FIG. 13 is an exploded perspective view showing a battery assembly 15 of a battery pack according to a fourth embodiment of the present aspect. In the figure, the same parts as those of FIG. 4 are denoted by the same reference numerals, and detailed descriptions thereof are omitted.

A substrate holder 23n of the present embodiment includes the first side plate 23a, the second side plate 23b connected to one side of the first side plate 23a, and a third side plate 23p connected to the other side of the first side plate 23a. The third side plate 23p has an exposure hole 23q for exposing the lead attachment plate 21b. Although the second lead 22e protrudes by its thickness from the third side plate 23p when spot-welded to the lead attachment plate 21b, a brim 23r having a width not less than the thickness of the second lead 22e is provided above the third side plate 23p.

Therefore, in the present embodiment, since the brims 23g, 23h, and 23r are disposed in all the parts where there is clearance between the case 3 and the battery assembly 15, the exposure of the inside of the battery pack is prevented and the battery assembly 15 is protected with reliability.

Fifth Embodiment

Figure 15:
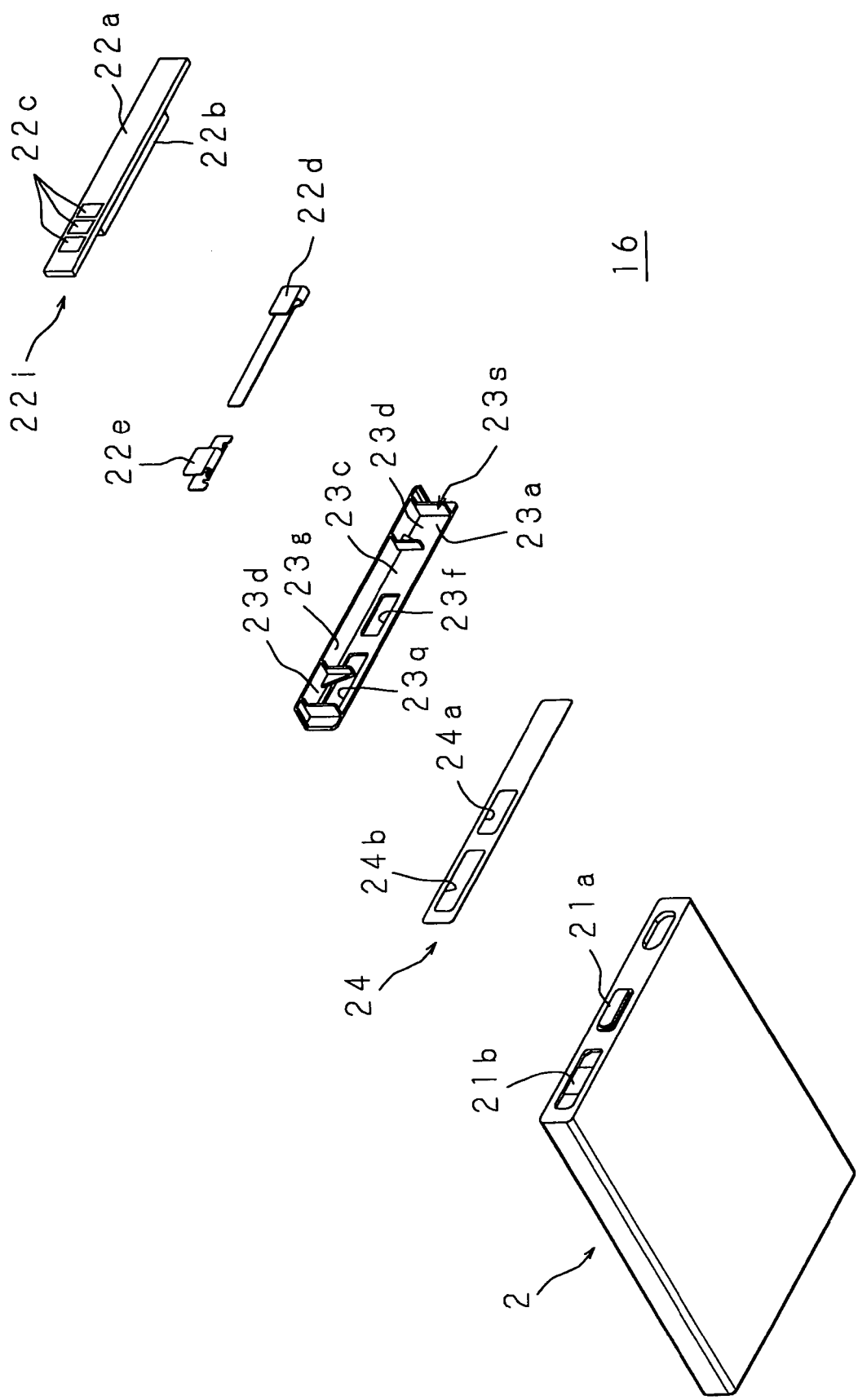
FIG. 15 is an exploded perspective view showing the battery assembly.

FIG. 14 is a perspective view showing a battery assembly 16 of a battery pack according to a fifth embodiment of the present aspect. FIG. 15 is an exploded perspective view showing the battery assembly 16. In these figures, the same parts as those of FIGS. 3 and 4 are denoted by the same reference numerals, and detailed descriptions thereof are omitted.

In the cell 21 of the battery assembly 16, the lead attachment plate 21b is provided at the end of the side surface where the negative terminal 21a is provided. The fixing tape 24 has exposing holes 24a and 24b for exposing the negative terminal 21a and the lead attachment plate 21b.

In the protecting circuit part 22i of the present embodiment, the second lead 22e is disposed on the rear side of the end of the substrate 22a on the side where the external output terminals 22c are provided, and the first lead 22d is disposed opposite to the circuit element 22b.

A substrate holder 23s of the present embodiment includes one side plate 23a which has the exposure holes 23f and 23q for exposing the negative terminal 21a and the lead attachment plate 21b. The outside of the exposure hole 23f is the circuit element fitted part 23c in which the circuit element 22b and the first lead 22d are fitted, and both sides thereof are the substrate supporters 23d holding both ends of the substrate 22a.

The side plate 23a further has the brim 23g protruding from the side plate 23a and having a width not less than the sum of the thicknesses of the first lead 22d, the circuit element 22b, and the substrate 22a.

In the present embodiment, the first lead 22d, the second lead 22e, the circuit element 22b, and the substrate 22a disposed on one side surface of the cell 21 and protruding from the side plate 23a can be all protected by the brim 23g.

Sixth Embodiment

Figure 16:
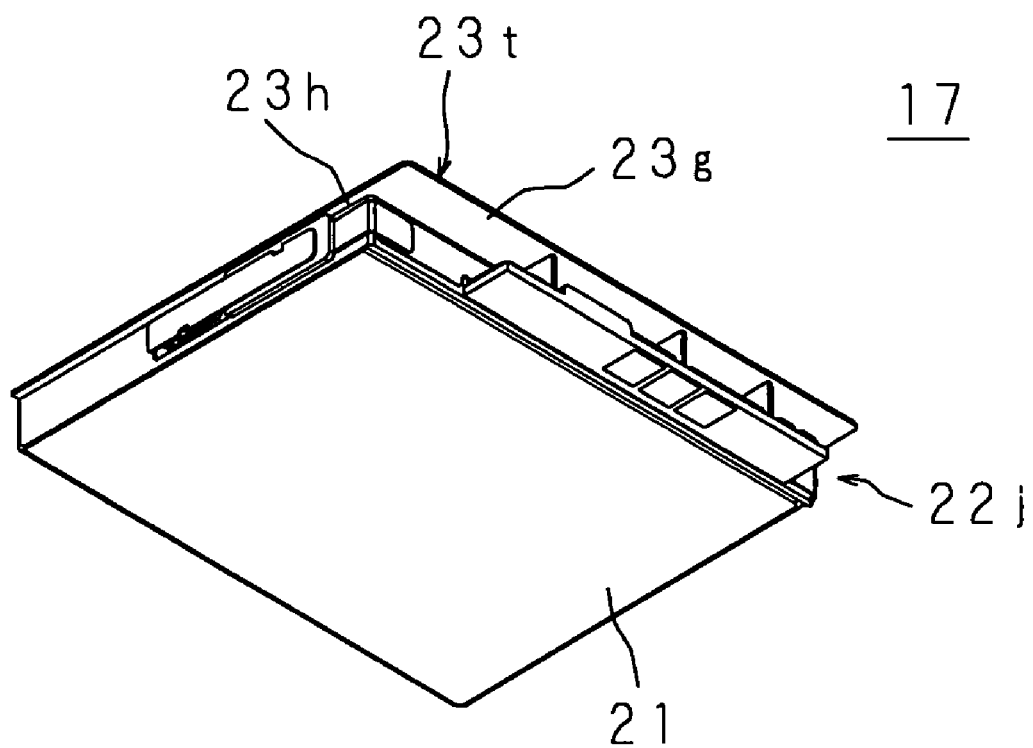
FIG. 16 is a perspective view showing a battery assembly of a battery pack according to a sixth embodiment of the present aspect.

FIG. 16 is a perspective view showing a battery assembly 17 of a battery pack according to a sixth embodiment of the present aspect. FIG. 17 is an exploded perspective view showing the battery assembly 17. In the figures, the same parts as those of FIGS. 3 and 4 are denoted by the same reference numerals, and detailed descriptions thereof are omitted.

In the battery assembly 17 of the present embodiment, the substrate 22a of the protecting circuit part 22j is laterally disposed on a side surface of the cell 21.

The circuit element 22b for preventing overcharging or over-discharging is provided on the surface of the substrate 22a of the protecting circuit part 22j, positive and negative electrode plates (not shown) are connected to the circuit element 22b, and the electrode plates are connected to the cell 21 through the first lead 22d and the second lead 22e, respectively. The external output terminals 22c for taking out power to the outside and taking in power from the outside for charging are formed by gold plating on the rear surface of the substrate 22a.

A substrate holder 23t of the present embodiment includes the first side plate 23a and the second side plate 23b. The brim 23g is provided above the first side plate 23a, and the brim 23h is provided above the second side plate 23b.

The brim 23g has a width not less than the protruding amount of the substrate 22a protruding from the first side plate 23a when the protecting circuit part 22j is fitted on the substrate holder 23t. Ribs 23u are provided to hang from the brim 23g, thereby inhibiting a movement of the substrate 22a in a direction perpendicular to the plane thereof.

The brim 23h protrudes by an amount substantially equal to the sum of the thicknesses of the PTC element 22f, the first lead 22d, and the third lead 22g.

Conventionally, in the case of a battery pack where a battery assembly in which the substrate of the protecting circuit is laterally disposed on a side surface of the cell is accommodated in a box-shaped case, an upper case having a cover for covering the protecting circuit is fitted on the case. In the present embodiment, since the brim 23g of the substrate holder 23t performs the function of the upper case of filling the clearance between the battery assembly 17 and the case 3 to thereby prevent the exposure of the inside and protect the substrate 22a of the protecting circuit part 22j, the upper case can be deleted.

As this aspect may be embodied in several forms without departing from the spirit of essential characteristics thereof, the present embodiment is therefore illustrative and not restrictive, since the scope of the aspect is defined by the appended claims rather than by the description preceding them, and all changes that fall within metes and bounds of the claims, or equivalence of such metes and bounds thereof are therefore intended to be embraced by the claims.

What is claimed is:

1. A battery pack comprising:
    a battery assembly including:
        a cell having a rectangular parallelepiped form including two parallel planes and four side surfaces, and having a protruding electrode on one of the side surfaces;
        a protecting circuit substrate having an external output terminal and a protecting circuit, and longitudinally disposed on the side surface of the cell;
        a first lead connecting one electrode of the protecting circuit substrate and the protruding electrode; and
        a second lead connecting the other electrode of the protecting circuit substrate and a side part of the cell, the side part being an electrode of a polarity different from a polarity of the protruding electrode;
    a case having an opening on one face and accommodating the battery assembly; and
    a label covering a part or all of the battery assembly and the case,
    wherein a substrate holder is provided that includes:
    a side plate interposed between the protecting circuit substrate and the side surface of the cell where the protecting circuit substrate is disposed; and
    a brim provided to protrude outward from the side plate in a direction of a thickness of the protecting circuit substrate by an amount not less than the thickness of the protecting circuit substrate.

2. A battery pack comprising:
    a battery assembly including:
        a cell having a rectangular parallelepiped form including two parallel planes and four side surfaces, and having a protruding electrode on one of the surfaces;
        a protecting circuit substrate having an external output terminal and a circuit element, and laterally disposed on the side surface of the cell;
        a first lead connecting one electrode of the protecting circuit substrate and the protruding electrode; and
        a second lead connecting the other electrode of the protecting circuit substrate and a side part of the cell, the side part being an electrode of a polarity different from a polarity of the protruding electrode;
    a case having an opening on one face and accommodating the battery assembly; and
    a label covering a part or all of the battery assembly and the case,
    wherein a substrate holder is provided that includes:
    a side plate interposed between the protecting circuit substrate and the side surface of the cell where the protecting circuit substrate is disposed;
    a brim provided to protrude outward from the side plate in a protruding direction of the protecting circuit substrate by an amount not less than a protruding amount of the protecting circuit substrate; and
    a rib provided to hang from the brim for inhibiting a movement of the protecting circuit substrate in a direction perpendicular to the plane thereof.

3. The battery pack according to claim 1, wherein the substrate holder has a side plate where the first lead and/or the second lead are independently disposed, and
    a brim is provided to protrude outward from the side plate in a direction of a thickness of the first lead or the second lead by an amount not less than the thickness of the first lead or the second lead.

4. The battery pack according to claim 2, wherein the substrate holder has a side plate where the first lead and/or the second lead are independently disposed, and
    a brim is provided to protrude outward from the side plate in a direction of a thickness of the first lead or the second lead by an amount not less than the thickness of the first lead or the second lead.

5. The battery pack according to claim 1, wherein a protruding part is provided to protrude outward from the brim, and
    the case has a concave in which the protruding part is fitted, in an opening-side edge of the side plate of the case, opposed to the brim.

6. The battery pack according to claim 2, wherein a protruding part is provided to protrude outward from the brim, and
    the case has a concave in which the protruding part is fitted, in an opening-side edge of the side plate of the case, opposed to the brim.

7. The battery pack according to claim 3, wherein a protruding part is provided to protrude outward from the brim, and
    the case has a concave in which the protruding part is fitted, in an opening-side edge of the side plate of the case, opposed to the brim.

8. The battery pack according to claim 4, wherein a protruding part is provided to protrude outward from the brim, and
    the case has a concave in which the protruding part is fitted, in an opening-side edge of the side plate of the case, opposed to the brim.

9. The battery pack according to claim 3, wherein the side surface of the cell where the protruding electrode is provided and the side surface of the cell where the protecting circuit substrate is disposed are two adjoining side surfaces, and
    the substrate holder abuts on the two side surfaces.

10. The battery pack according to claim 4, wherein the side surface of the cell where the protruding electrode is provided and the side surface of the cell where the protecting circuit substrate is disposed are two adjoining side surfaces, and
    the substrate holder abuts on the two side surfaces.

11. The battery pack according to claim 3, wherein the side plate supports the first lead and a protecting element, and
    the brim of the side plate protrudes by an amount not less than a sum of the thickness of the first lead and a thickness of the protecting element.

12. The battery pack according to claim 4, wherein the side plate supports the first lead and a protecting element, and the brim of the side plate protrudes by an amount not less than a sum of the thickness of the first lead and a thickness of the protecting element.

13. The battery pack according to claim 11, wherein the protecting element is a discrete element selected from a group comprising a PTC element, a fuse, and a bimetallic switch or a composite element into which the discrete elements are combined.

14. The battery pack according to claim 12, wherein the protecting element is a discrete element selected from a group comprising a PTC element, a fuse, and a bimetallic switch or a composite element into which the discrete elements are combined.

15. The battery pack according to claim 1, wherein the side plate supports the first lead, and the brim of the side plate protrudes by an amount not less than a sum of the thickness of the protecting circuit substrate and a thickness of the first lead.

16. The battery pack according to claim 1, wherein the substrate holder has a side plate where the first lead and/or the second lead are independently disposed, the side plate has a brim provided to protrude outward from the side plate in a direction of a thickness of the first lead or the second lead by an amount not less than the thickness of the first lead or the second lead, each of the brims has a protruding part protruding outward, and the case has concaves in which the protruding parts are respectively fitted, in an opening-side edge of each of the side plates of the case, opposed to each of the brims.

17. The battery pack according to claim 16, wherein the side plate supports the first lead and a protecting element, and the brim of the side plate protrudes by an amount not less than a sum of the thickness of the first lead and a thickness of the protecting element.

18. The battery pack according to claim 17, wherein the protecting element is a discrete element selected from a group comprising a PTC element, a fuse, and a bimetallic switch or a composite element into which the discrete elements are combined.

* * * * *